2,723,205

WHITE GLASS MARKING INK AND METHOD OF MARKING GLASS THEREWITH

John L. Gallup, Bloomfield, and George Palty, East Orange, N. J., assignors to Radio Corporation of America, a corporation of Delaware No Drawing. Application April 1, 1953, Serial No. 346,284

6 Claims. (Cl. 117—46)

This invention relates to glass marking inks and more particularly to an improved opaque white glass marking ink that may be fused by heating to a glass surface to produce a permanent opaque mark thereon.

Especially in the production of electron vacuum tubes, difficulty has previously been experienced in providing a suitable marking ink that could be quickly and cheaply applied to the exterior surface of a glass envelope to produce a permanent and readily visible identifying mark thereon. Previously it has been general practice to mark such electron vacuum tubes with an ink comprising silver oxide which was then fired to fuse the ink to the glass. Such inks, although satisfactory, have several disadvantages among which are: a relatively high degree of difficulty in providing successive quantities of the ink having uniform quality; and, the mark produced by the ink may tarnish and it often exhibits poor visibility due to a low degree of contrast between the mark and the glass to which it is applied.

It is an object of the invention to provide an improved glass marking ink.

Another object of the invention is to provide an improved glass marking ink capable of producing a permanent opaque white mark upon a glass surface.

Still another object of the invention is to provide an improved glass marking ink especially adapted for marking electron vacuum tubes.

According to the present invention, an improved white glass marking ink is provided, comprising titanium dioxide, eutectic lead borate and glycerine, which may be readily applied to a glass surface and fired thereon to produce a permanent opaque white mark.

The invention may be more easily understood by reference to the following detailed description.

The invention may be advantageously practiced in connection with various glass and glass coated articles. The following description, although concerned principally with electron vacuum tubes, is intended to be merely illustrative.

In a preferred embodiment of the invention, about 8 parts titanium dioxide, 12 parts eutectic lead borate and 20 parts glycerine by weight, are thoroughly ground and mixed by milling for about 48 hours in a porcelain ball mill. The mixing may be alternatively carried out by any other convenient means, such as a rod mill adapted to provide a high degree of pulverization and intermixture of the ingredients.

The resulting mixture is spread upon a platen. A rubber roller rolls back and forth across the platen and across the face of a rubber stamp which is impressed upon successive glass surfaces. In this manner, a controlled and uniform quantity of the marking ink is applied by the rubber stamp to each glass surface it is desired to mark. The glass surfaces are then carried by any suitable conveyor apparatus past a gas flame of sufficient intensity to heat the marked glass surface to approximately 550° C. This heating serves to oxidize and drive off the glycerine of the ink mixture and to fuse the eutectic lead borate to the surface of the glass. The titanium dioxide is not affected by the heat but becomes fused with the lead borate, producing a dense opaque mark having a relatively high degree of whiteness.

Satisfactory marks may also be produced using compositions that vary somewhat from that described in the description of the preferred embodiment of the invention. In general, satisfactory inks may be formed consisting of any proportions within the following ranges, given as parts by weight:

| | Parts |
|---|---|
| Titanium dioxide | 5 to 12 |
| Eutectic lead borate | 15 to 8 |
| Glycerine | 10 to 30 |

The composition of the ink may be varied somewhat from the ingredients described above, especially with respect to the liquid vehicle, glycerin. In place of glycerin there may be substituted, although with less satisfactory results, any of a large number of polyhydric alcohols such as polypropylene glycol, triethylene glycol or other polyalkylene glycols. A relatively small amount of silica, up to about 2 parts by weight, may also be included in the composition, and any of a large number of other glass-making ingredients may be added in small amounts without adversely affecting the properties of the ink.

The eutectic lead borate described in connection with the preferred embodiment comprises 88% PbO and 12% $B_2O_3$. This composition may be varied within the limits of about ±3% to provide an ink that fuses at a slightly higher temperature than the ink according to the preferred embodiment, but still below the softening point of a soft glass such as that generally used in the manufacture of electron vacuum tubes.

It should be understood that the method for applying the ink to a glass surface as described in the example is not essential in the practice of the invention, nor is it essential that the ink be fired by a gas flame. The ink may be applied by any convenient means such as a hand-held rubber stamp, a brush or a pipette. And it may be fired by any suitable means such as an infra-red radiation source or an electric resistance element, capable of heating the marked surface to a temperature within the range of about 425° C. to 700° C., preferably in an oxidizing atmosphere.

Depending upon the method of application of the ink to the glass surface, the proportions of the liquid vehicle in the ink may be relatively critical to produce a clear, unblurred mark. However, this factor appears to be largely dependent upon the viscosity that works best with a particular method of transferring the ink from its container to the glass surface.

The glass marking ink according to the invention is particularly advantageous when compared with the silver marking ink previously used, especially in marking electron vacuum tubes, in that it is relatively cheap to produce, requires relatively little skill or judgement in its manufacture, is relatively uniform from batch to batch, has greater visibility and is more strongly adherent to a glass surface.

There has thus been described an improved glass marking ink adapted to produce a permanent opaque white mark when fired upon a glass surface, and particularly suitable for marking electron vacuum tubes.

What is claimed is:

1. A glass marking ink consisting essentially of by weight 5 to 12 parts titanium dioxide, 15 to 8 parts eutectic lead borate and 10 to 30 parts of a polyalkylene glycol.

2. A glass marking ink consisting essentially of the following proportions by weight:

| | Parts |
|---|---|
| Titanium dioxide | 5 to 12 |
| Eutectic lead borate | 15 to 8 |
| Glycerine | 10 to 30 |

3. A glass marking ink consisting essentially of the following proportions by weight:

| | Parts |
|---|---|
| Titanium dioxide | 8 |
| Eutectic lead borate | 12 |
| Glycerine | 20 |

4. A method for marking glass comprising placing upon a glass surface a film of a mixture consisting essentially of the following proportions by weight:

| | Parts |
|---|---|
| Titanium dioxide | 5 to 12 |
| Eutectic lead borate | 15 to 8 |
| Glycerine | 10 to 30 | and heating said surface to about 425° C. to 700° C.

5. A method for marking glass comprising placing upon a glass surface a film of a mixture consisting essentially of the following proportions by weight:

| | Parts |
|---|---|
| Titanium dioxide | 8 |
| Eutectic lead borate | 12 |
| Glycerine | 20 | and heating said surface to about 425° C. to 700° C.

6. The method according to claim 4 in which said heating is carried out in an oxidizing atmosphere.

References Cited in the file of this patent

UNITED STATES PATENTS

| 1,538,890 | Fredenburgh | May 26, 1925 |
| 2,617,740 | Morris | Nov. 11, 1952 |
| 2,634,219 | Smith | Apr. 7, 1953 |

FOREIGN PATENTS

| 566,718 | Great Britain | Aug. 16, 1945 |